United States Patent [19]

Griffin

[11] 4,235,056
[45] Nov. 25, 1980

[54] GLASS RETAINING CLIP
[75] Inventor: Henry W. Griffin, Birmingham, Mich.
[73] Assignee: General Motors Corporation, Detroit, Mich.
[21] Appl. No.: 36,783
[22] Filed: May 7, 1979
[51] Int. Cl.² .............................................. E06B 3/62
[52] U.S. Cl. ....................................... 52/397; 52/208; 52/775; 85/81; 151/41.75
[58] Field of Search ................. 52/208, 397, 766, 767, 52/768, 775; 85/81; 151/41.75

[56] References Cited
U.S. PATENT DOCUMENTS

| 2,087,515 | 7/1937 | Hunt | 52/768 |
| 2,873,496 | 2/1959 | Elms | 151/41.75 |
| 3,296,763 | 1/1967 | Carl | 52/766 |
| 3,566,570 | 3/1971 | Evans | 52/775 |
| 3,981,697 | 9/1976 | Backthrope | 52/208 |
| 4,139,234 | 2/1979 | Morgan | 52/208 |

FOREIGN PATENT DOCUMENTS 1437648  7/1973  United Kingdom .................. 151/41.75

Primary Examiner—James A. Leppink
Assistant Examiner—H. E. Raduazo
Attorney, Agent, or Firm—Arthur N. Krein

[57] ABSTRACT

A glass retaining clip includes a plastic anchor adapted for push-in insertion into a pierced hole, one leg of the clip having a threaded aperture therethrough to receive a screw fastener which is adapted to engage the adjacent leg whereby the legs can be forced apart forcing the adjacent leg to move into abutment against a glass window panel mounted into one side of a body window opening.

3 Claims, 4 Drawing Figures

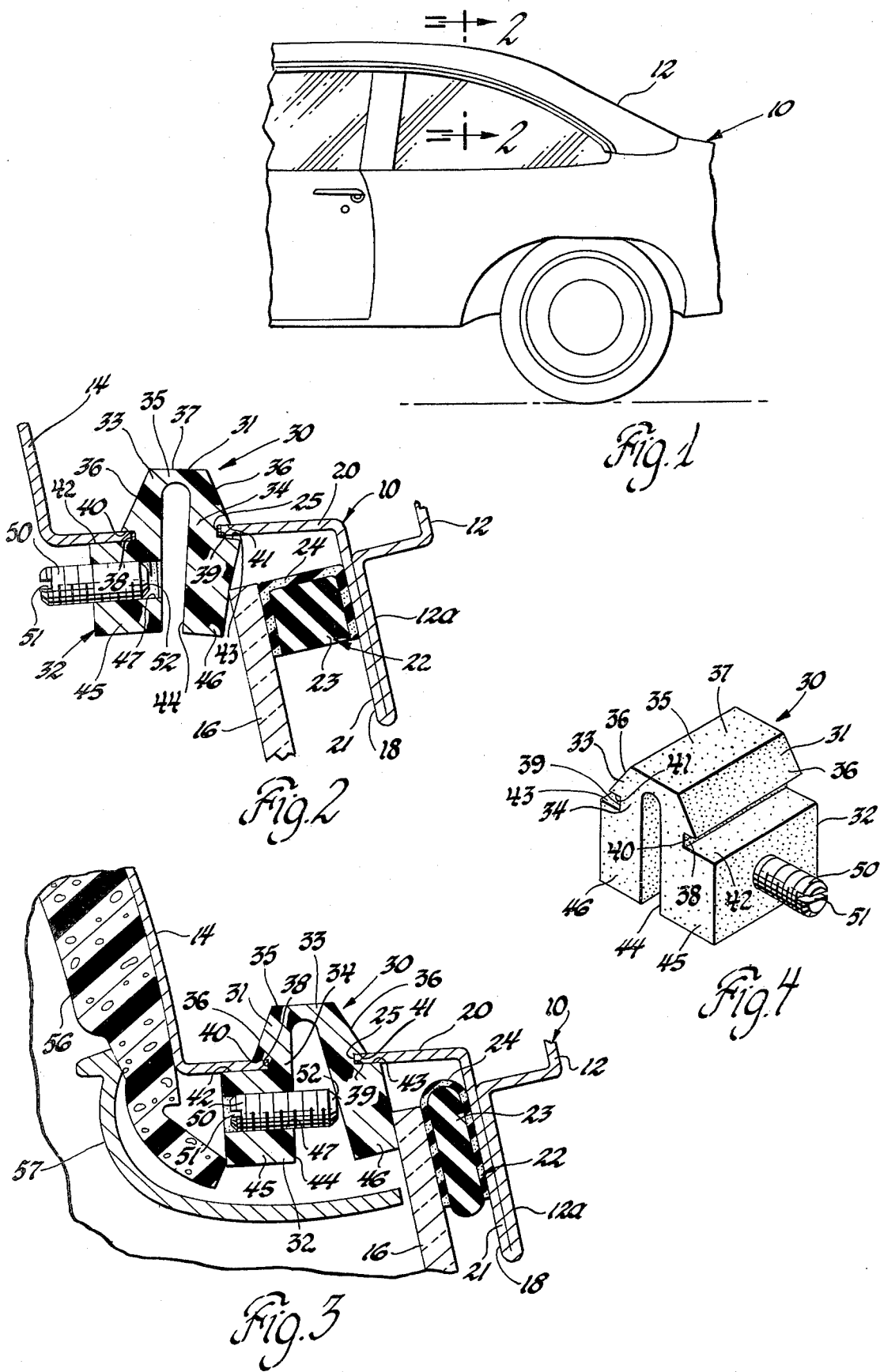

GLASS RETAINING CLIP

FIELD OF THE INVENTION

This invention relates to a window assembly and, in particular, to a glass retaining clip for use in a window assembly.

DESCRIPTION OF THE PRIOR ART

Window assemblies for automotive vehicles have heretofore been provided wherein a glass panel with weather stripping about or adjacent to its periphery is maintained within a window receiving opening in an automotive vehicle body by various retaining means. For example, in certain assemblies resilient retaining strips have been used to retain the glass panel in place and in other assemblies suitable clips which lodge on and are located as, for example, by headed studs welded to the window frame have been used with an ornamental molding to retain the glass panel in position. However, various problems have been encountered relative to such window assemblies of the prior art. For example, inaccuracies in welding the studs to the window frame have adversely effected the alignment of the clips and therefore alignment of other elements of the assembly.

SUMMARY OF THE INVENTION

The present invention relates to a glass retaining clip that includes a plastic anchor adapted to snap into attachment with the support structure for a glass panel, the anchor having a pair of spaced apart legs one of which threadedly receives a threaded fastener which is adapted to abut against the other leg whereby a force can be applied to the other leg to move it into abutment against the glass panel to retain the glass panel in place.

Accordingly, the primary object of this invention is to provide a new and improved window assembly and, in particular, a glass retaining clip for such a window assembly, the retaining clip including a plastic anchor which is adapted for snap fit engagement into an aperture in the support structure for the glass panel, the anchor further having a leg which is adapted to be forced by a fastener means into abutting relationship with the glass panel for retaining the same in place.

Another object of this invention is to provide an improved glass retaining clip for use in the installation of a window panel in an automotive vehicle.

A further object of this invention is to provide an improved glass retaining clip for use in retaining a window in a vehicle body.

A still further object of this invention is to provide a relatively simple and ecomonical means and procedure for securing a glass panel in a vehicle body.

For a better understanding of the invention, as well as other objects and further features thereof, reference is had to the following detailed description of the invention to be read in connection with the accompanying drawings, wherein:

BRIEF DESCRIPTION OF THE DRAWINGS

FIG. 1—is a fragmentary side elevational view of an automobile vehicle body having a window assembly with a glass retaining clip of the invention as part thereof;

FIG. 2—is an enlarged sectional view taken along line 2—2 of FIG. 1 showing the window assembly with a glass retaining clip in accordance with the invention loosely installed in the vehicle support structure surrounding the loosely positioned glass panel;

FIG. 3—is a view similar to FIG. 2, but showing the glass retaining clip securely locked to the support structure and firmly retaining the glass panel in place adjacent to the window opening; and, FIG. 4—is a perspective view of the glass retaining clip per se shown in FIGS. 2 and 3.

DESCRIPTION OF THE EMBODIMENTS

With reference to the FIGS. 1, 2 and 3, the reference character 10 designates an automobile vehicle body having a rear quarter portion including an outer roof panel 12 and spaced inner panel 14 suitably secured together at their lower edges with reference to the drawings, as by being formed integral from a large panel, to provide a window support structure defining at least the upper part of a window receiving opening or frame for a rear quarter window panel 16 positioned between the upper edge or belt line of the rear quarter portion and the lower edge of the roof panel 12. The window frame adjacent to the opening is of L-shape or angle iron configuration.

As best seen in FIGS. 2 and 3, this support structure is defined by the inner panel 14 which has a first or base wall portion 20 bent at a suitable angle to the major portion of the inner panel 14 to define the surface of the window receiving opening, this base wall portion 20 being of suitable width to receive the window 16 and the glass retaining clip of the invention, generally designated 30 forming part of the window assembly. The inner panel 14 also includes, at its lower terminal end, a second or side wall portion 21 bent at a suitable, predetermined angle to the base wall portion 20, this side wall portion 21 projecting inward of the window receiving opening to serve, in effect, as a stop or seat for the window panel 16. This side wall portion 21 is suitably secured to a bent end flange portion 12a of the outer roof panel 12, as by being formed integral therewith, to define therewith a window opening 18 for the window panel 16.

A suitable strip seal 22 is adapted to be sandwiched between a face of a window panel 16 and the exposed inner surface of the side wall portion 21. Seal 22 in the embodiment shown is a foam core butyl and, specifically a saturated urethane foam core 23 coated on three sides (FIG. 2) with suitable adhesive sealant, such as butyl rubber 24 ranging in thickness, for example, of from 1.0 to 1.5 mm. The fourth side of core 23 is left uncoated so as to permit the escape of air therefrom upon compressing of the seal strip from the cross-section shape shown in FIG. 2 to the cross-sectional shape shown in FIG. 3.

In the construction illustrated, the base wall portion 20 of the window support structure is provided at suitable spaced apart locations with a plurality of apertures 25 therethrough, each such aperture 25 being of a size and configuration, preferably rectangular, so as to receive the anchor 31 of the glass retaining clip 30 to be described in detail hereinafter.

The glass retainer clip 30 as shown in FIGS. 2, 3 and 4, includes an anchor 31 and at least one externally threaded screw fasteners 50.

Anchor 31 made of a suitable plastic material and preferably polygonal in shape, such as the rectangular configuration in the embodiment shown, includes a base 32 with a retaining stud 33 extending therefrom. The stud 33 includes a shank 34 that extends from the base 32 and terminates at a button-like head 35 having oppositely tapered sides 36 and a flat head 37 in the construction shown. Thus the upper surface of the head 35 is suitably shaped whereby to facilitate the entry of this head of the retainer 33 into an aperture 25 to effect assembly of the anchor 31 to the base wall portion 20.

As will be apparent, the shank 34, which is preferably of rectangular shape, is of a suitable size so as to be received in a complimentary shaped aperture 25 in the base wall portion 20. Thus as will be apparent, the shank should be provided with at least one and preferably two flat sides 38 and 39 for engaging the straight side edges of the complimentary shaped aperture 25 for preventing rotation of the anchor 31 with respect to the base wall portion 20. For a purpose which will become apparent, in the embodiment of the anchor 31 illustrated, the shank 34 is preferably located off center relative to the transverse width of the base 32.

Head 35 of the retainer stud 33 terminates at its lower end, with reference to the figures, in abutment shoulders 40 and 41 that extend transversely outward from the opposite transverse sides of the shank 34 along the full longitudinal extent of the head for engagement against one side of the base wall portion 20.

Also as shown, the base 32 is of a suitable width so as to extend transversely outward from opposite sides of the shank 34 whereby to define abutment shoulders 42 and 43 for engagement against the opposite side of base wall portion 20 from shoulders 40 and 41, respectively. The opposed sets of shoulders 40–42 and 41–43 are preferably spaced apart a predetermined distance corresponding approximately to the thickness of base wall portion 20 next adjacent to the aperture 25.

A longitudinal through slot 44 is provided in anchor 31 so as to extend from the free end of base 32 through the shank 34 to penetrate part way into the head 35 substantially along the central axes of both the shank 34 and head 35. The slot 44, as shown in FIGS. 2, 3 and 4, serves to divide the base 32 into two portions thereby providing two spaced apart legs 45 and 46. These legs 45 and 46 in the as formed configuration of the anchor 31, as shown in FIG. 4, are in predetermined, substantially parallel spaced apart relationship to each other. Thus the anchor 31, when viewed from an end thereof or when viewed in transverse cross-section, appears to be of inverted U-shaped with reference to the FIGS. 2-4.

The slot 44 also allows the portions of the stud 33 on opposite sides of the slot to be compressed together so that the head 35 and shank 34 portions thereof can pass through the associated aperture 25 whereupon they can then spread apart whereby the anchor 31 will be retained in the base wall portion 20, in the manner shown in FIG. 2.

The anchor 31 is made of a suitable resilient material so that the retainer stud thereof can be resiliently snapped into an aperture 25 in the base wall portion 20 and so as the legs 45 and 46 can be spread apart, in a manner to be described, whereby the leg 46 can be positioned so as to serve as an abutment retainer for the window panel 16. It is suggested that a very suitable material for the anchor 31 is a thermoplastic material such as nylon, Delrin or polyethylene whereby the anchor can be injection molded in one piece.

Leg 45, which is the leg having the greater transverse extent, is provided with at least one through, transverse, internally threaded aperture 47 of a size so as to threadedly receive the screw fastener 50 therein. In the construction shown, wherein the anchor 31 is of limited, predetermined longitudinal extent, the aperture 47 is located centrally, intermediate the longitudinal extent of the leg 45 and substantially equidistant between the shoulder 42 and the free end of the leg. The screw fastener 50 is provided with suitable means, such as the screw driver receiving slot 51, whereby the screw fastener can be rotated in the threaded aperture 47 by an assembler using an appropriate tool.

As best seen in FIG. 2, the screw fastener 50, prior to assembly of the anchor 31 to the base panel portion 20, is threaded only part way in the aperture 47 so that the tip 52 of the screw fastener 50 will not project beyond the inboard face of the leg 45. With the screw fastener 50 thus positioned, it will not interfere with collapsing the two legs 45 and 46 together, since such collapsing together of the legs will facilitate assembly of the stud 33 into an associated aperture 25 in the base wall portion 20.

To effect assembly of the window panel 16 in the window frame, the window panel 16 is first loosely positioned in the window frame with the strip seal 22, as fabricated, loosely sandwiched between the panel 16 and the wall portion 21, as shown in FIG. 2. The anchor 31 of the glass retainer clip 30 is then installed into an associated aperture 25. To effect this assembly, the head 35 of the stud 33 is aligned with an associated aperture and then forced through as the two legs 45 and 46 are collapsed toward each other. As shown in FIG. 2, after insertion of the retainer stud through an aperture 25, the material of the base wall portion on opposite sides of the aperture 25 will be received between the adjacent pair of shoulders 40–42 and 41–43, with the leg 46 then positioned so as to abut against the inboard surface of the window panel 16.

Thereafter, the screw fastener 50 is driven in a rotational direction whereby the tip 52 thereof is advanced so as to abut against the leg 46. Accordingly, as the screw fastener 50 is advanced further, it will cause pivotable movement of the leg 46, in a counter clockwise direction with reference to the FIG. 2 so as to cause the window panel 16 to move in a direction, to the right with reference to this Figure, compressing the strip seal 22 into the configuration shown in FIG. 3. Thus by advancement of the screw fastener 50 to the position shown in FIG. 3, the window panel 16 has been forced to move in a corresponding direction to the position shown, the leg 46 then being operative to retain the window panel 16 in the window frame in the position shown in FIG. 3.

In the embodiment of the anchor 31 illustrated, the anchor 31 is of limited longitudinal extent and, accordingly only one aperture 47 and screw fastener 50 is used in this embodiment. However, it will be apparent to those skilled in the art that, if desired, the anchor 31 can be made any size and can in fact be made of a longitudinal extent corresponding substantially to the associated extent of the window panel 16. It will also be apparent that, if the longitudinal extent of the anchor 31 is increased substantially, then a plurality of threaded apertures 47 and screw fasteners 50 would be required whereby to provide for the suitable retention of the window panel 16.

After the window panel 16 has been secured in the window frame by the glass retaining clips 30, the inboard portion of the window frame between the window panel 16 and the normal headliner 56 is covered for aesthetic purposes with a garnish molding 57 suitably secured in any conventional manner, as desired.

The embodiments of the invention in which an exclusive property or privilege is claimed are defined as follows:

1. A glass retaining clip for use in a vehicle body having a support structure providing a first wall defining a window receiving opening and a second wall at a predetermined angle to the first wall defining a window opening, and a glass panel positioned within the receiving opening in abutment against the second wall with a seal sandwiched therebetween, the first wall having at least one rectangular aperture therethrough spaced from the glass panel; said glass retaining clip including an anchor and a screw fastener, said anchor comprising a base portion with a retainer stud extending therefrom for insertion into the aperture in the first wall; said base portion and said retainer stud portion presenting spaced apart shoulder surfaces engageable with opposite sides of the first wall; means providing a slot extending through and from the free end of said base portion into said stud portion to divide said base portion into a first leg adapted to abut against the glass panel and a second leg, said second leg having an internally threaded aperture therethrough; said screw fastener being threaded into said threaded aperture and adapted to extend through said second leg whereby to abut against said first leg so that said screw is operable to effect spreading of said first leg relative to said second leg so as to retain the glass panel in abutment against the second wall with the seal compressibly sandwiched therebetween.

2. A glass retaining clip for use in a vehicle body having a support structure providing a first wall defining a window receiving opening and a second wall at a predetermined angle to the first wall defining a window opening, and a glass panel positioned within the receiving opening in abutment against the second wall with a seal sandwiched therebetween, the first wall having at least one rectangular aperture therethrough spaced from the glass panel; said glass retaining clip including an anchor and a screw fastener, said anchor, of flexible plastic material, including a base portion and a noncircular stud portion extending from said base portion and adapted to extend through the aperture in the first wall to hold said anchor to said first wall; said base portion comprising a first leg and a second leg transversely spaced from said first leg; said first leg being adapted to abut against the glass panel after insertion of said anchor to the first wall; said stud portion comprising an inperforate head and a shank of reduced width relative to said head and said base portion whereby adjacent exposed surfaces of said head and base portion define opposed sets of spaced apart shoulder surface to grip opposite surfaces of the first wall; a central, internally threaded through aperture in said second leg; said screw fastener being threaded into said threaded aperture and adapted to extend through said second leg whereby to abut against said first leg so that said screw is operable to effect spreading of said first leg relative to said second leg so as to force said first leg into abutment against the glass panel whereby to position and retain the glass panel adjacent to the second wall with the seal compressibly sandwiched therebetween.

3. A glass retaining clip for use in positioning and retaining a glass panel in a support structure providing a first wall defining a window receiving opening and a second wall at a predetermined angle to the first wall defining a window opening, the glass panel being positioned within the receiving opening adjacent to the second wall with a seal sandwiched therebetween, the first wall having at least one rectangular aperture therethrough spaced from the glass panel; said glass retaining clip including an anchor and at least one screw fastener, said anchor comprising a base portion with a retainer stud extending therefrom of rectangular configuration for insertion into the aperture in the first wall; said base portion and said retainer stud portion presenting spaced apart shoulder surfaces engageable with opposite sides of the first wall; said anchor having a longitudinal slot means extending from the free end of the said base portion at least part way into said retainer stud portion to divide said base portion into a first leg adapted to abut against the glass panel and a second leg, said second leg having at least one internally threaded aperture therethrough; said at least one screw fastener being threaded into said threaded aperture so as to extend through said second leg into abutment against said first leg whereby to effect spreading of said first leg relative to said second leg so as to force said first leg into abutment against the glass panel to position and retain it adjacent to the second wall with the seal compressibly sandwiched therebetween.

* * * * *